(No Model.)
M. D. HANWAY.
EYEGLASSES.
No. 468,034. Patented Feb. 2, 1892.
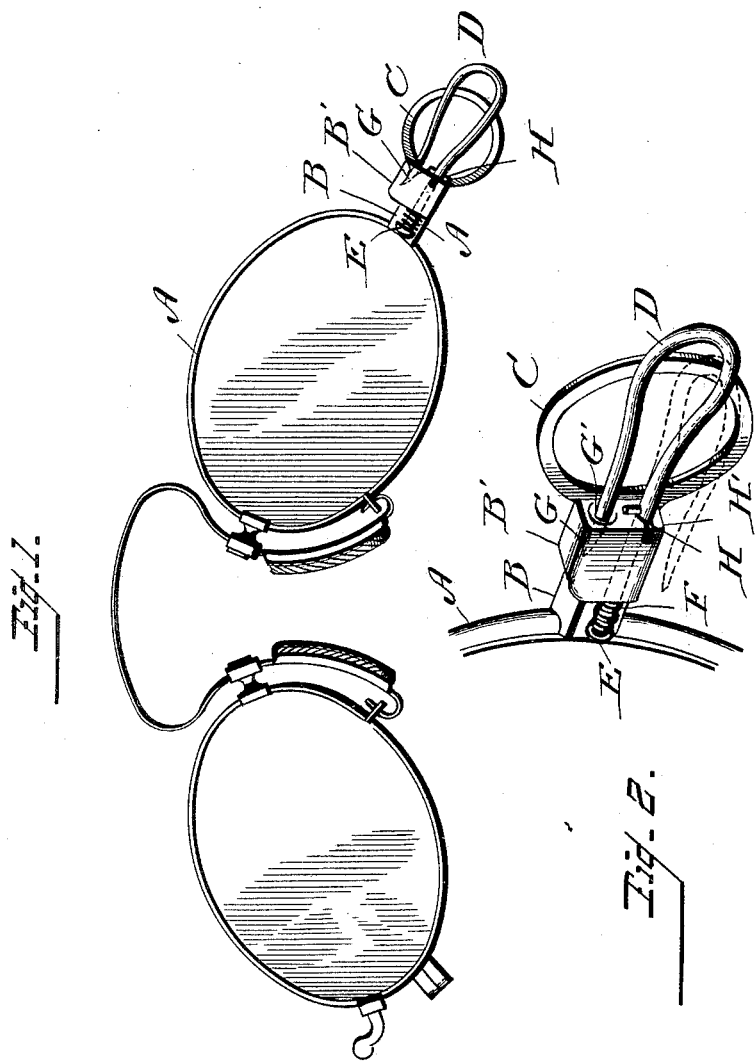
Witnesses
Inventor
Mary D. Hanway
By her Attorney
Franklin H. Hough

UNITED STATES PATENT OFFICE.

MARY D. HANWAY, OF BALTIMORE, MARYLAND.

EYEGLASSES.

SPECIFICATION forming part of Letters Patent No. 468,034, dated February 2, 1892.

Application filed October 24, 1891. Serial No. 409,689. (No model.)

*To all whom it may concern:*

Be it known that I, MARY D. HANWAY, a citizen of the United States, residing at Baltimore, in the State of Maryland, have invented certain new and useful Improvements in Eyeglasses; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention has for its object to provide, in connection with the frames of eyeglasses, a hook which may be readily brought into position for use when desired, and which when not required for use in suspending the glass will be turned to one side and the point of the hook retained within a suitable guard, thus preventing the same from catching upon articles or injuring the face or hands of the wearer.

To these ends and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 1 is a front view of a pair of eyeglasses with my improved attachment. Fig. 2 is an enlarged detail in perspective of the attachment.

Reference now being had to the details of the drawings by letter, A represents a pair of eyeglasses of ordinary and well-known construction.

B is an extension or arm which is is projected from one end of the frame and is provided with a ring C, within which may be secured a cord or chain, if desired. The arm B is provided upon its front face, adjacent to the ring C, with an enlargement B'.

D is a hook, which is formed of a single piece of wire bent as shown. The shank or body portion of the hook is passed loosely through an opening formed in the lower portion of the enlargement B' and at its extreme end is provided with an enlargement E.

F is a spiral spring which is sleeved upon the shank of the hook D, one end of the spring bearing against the enlargement E and its opposite end bearing against the enlargement B' of the arm B.

The point G of the hook D is, when the hook is not in use, received within an opening G', provided for the purpose in the outer end of the enlargement B'. Extending from the shank of the hook is a short arm H, which, when the hook is not in use, bears against the outer end of the enlargement B', and when the point of the hook is withdrawn from the recess G' and the hook has been turned to one side, as indicated by dotted lines in Fig. 2 of the drawings, said arm H will, by the tension of the spring F, be drawn into a notch H'.

In use when it is desired to use the hook the same is withdrawn from the recess G' and is turned into the position shown by dotted lines in Fig. 2. The arm H, entering the notch H', serves to lock the hook in position. It will be readily seen that by drawing the hook outward it may be turned so as to cause the point of the hook to be drawn into the recess G' by the tension of the spring F. By this construction it will be seen that the spring F serves to hold the hook both in its operative and also in its closed position.

Having thus described my invention, what I claim to be new, and desire to secure by Letters Patent, is—

1. The combination, with the frame of eyeglasses, of an arm connected therewith, a hook swiveled in said arm, and a spring sleeved upon the shank of the hook and serving to hold the same in either an operative or a closed position, substantially as and for the purpose described.

2. The combination, with the arm B, having enlarged portion B', of the hook D, having its shank passed loosely through an opening in the enlarged portion of the arm, an arm H upon the shank of the hook in advance of the portion B' of the arm and adapted to engage the notch H' therein when the hook is in an operative position, and a spring sleeved upon the shank of the hook and adapted to hold the hook in either an operative or closed position, substantially as described.

In testimony whereof I affix my signature in presence of two witnesses.

MARY D. HANWAY.

Witnesses:
JOHN HUBNER,
WM. H. JONES.